R. J. SHOEMAKER.
BEARING ELEMENT AND METHOD OF MANUFACTURING THE SAME.
APPLICATION FILED MAY 5, 1919.
1,841,938.
Patented June 1, 1920.
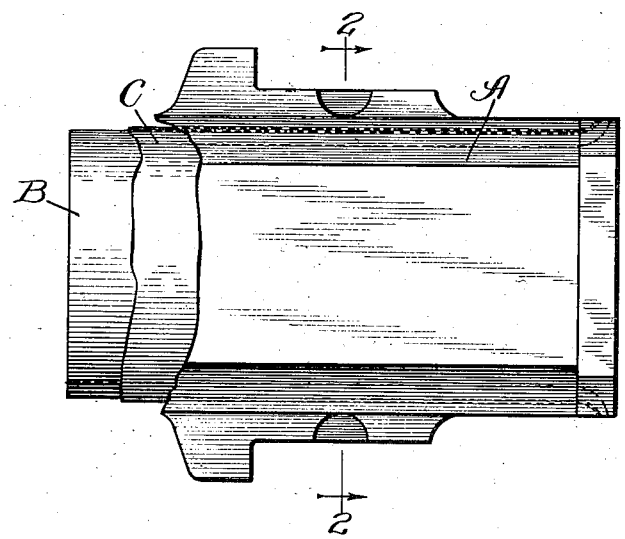
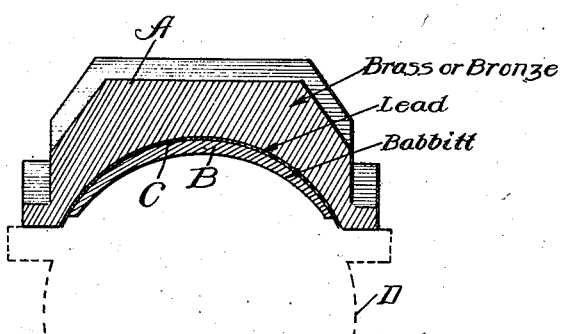

UNITED STATES PATENT OFFICE.

ROBERT JAY SHOEMAKER, OF TOPEKA, KANSAS.

BEARING ELEMENT AND METHOD OF MANUFACTURING THE SAME.

1,341,938.　　　　　Specification of Letters Patent.　　Patented June 1, 1920.

Application filed May 5, 1919. Serial No. 294,633.

*To all whom it may concern:*

Be it known that I, ROBERT J. SHOEMAKER, a citizen of the United States, residing at Topeka, in the county of Shawnee and State of Kansas, have invented certain new and useful Improvements in Bearing Elements and Methods of Manufacturing the Same, of which the following is a specification.

My invention relates to the manufacture of babbitted bearing elements, such, for example, as brasses used in railway journal boxes, and its object is to improve upon and reduce the cost of making articles of this class.

In manufacturing journal box brasses it has been customary, after "boring" or reaming the bearing surface or cleansing it with an acid, muriatic acid, for example, to cover the surface with a thin layer of solder consisting ordinarily of tin or of a mixture of lead and tin containing at least fifty per cent. of tin or the solder may consist of solder alone, after which the article is given its babbitt facing by pouring the babbitt, in a molten state, into the bearing element around a form which has the contour of the journal. The purpose of the solder is to provide a bond between the brass or bronze composing the body of the bearing element and its babbitt facing. With the methods of applying this solder heretofore used it has been necessary that the solder should contain the large proportion of tin stated in order to obtain a durable bond between the solder film and the brass. I found that as good a bond can be produced at a considerably reduced cost by plating the bearing element with lead or with lead containing a comparatively small percentage of an alloying metal such as tin, cadmium or bismuth, provided the lead is applied to the surface with the flux as hereinafter specified.

The drawing appended hereto shows a bearing element made in accordance with this invention.

Figure 1 is a fragmentary plan view of the bearing element, and

Fig. 2 is a cross sectional view on line 2—2 of Fig. 1 showing also the mandrel.

It will be understood that the invention is not limited to the production of journal box brasses but might be employed wherever a bearing element of brass, bronze or other material is required to have a babbitted facing or bearing surface.

In carrying on the manufacture of these articles the bearing surface of the brass is first bored or cleaned as above described in order to provide a surface free from oxids, and a flux is then applied to the surface, this flux consisting of a concentrated neutral solution of zinc chlorid containing preferably 70% of chlorid. The flux may be painted on the surface treated with a stiff bristle brush. The article is then dipped while wet with the flux into a bath of the molten plating metal sufficiently to submerge the fluxed surface. As a result of this treatment the surface is covered with a thin film or plating of the metal which will be found to be very homogeneous and will adhere firmly to the body of the bearing element. The babbitt is then poured into the bearing in the usual manner while the plating is still in a molten state. If the plating is applied as directed it will form a bond between the facing of babbitt and the brass or bronze body of the bearing element which is as reliable as the more expensive solder bond heretofore employed.

In the drawing, the body of the bearing member is shown at A. B is the babbitt facing, and C the plating of lead. D is the form used in pouring the babbitt. It may be desirable in some cases to mix a small quantity of tin (or cadmium or bismuth might be used except that these metals are expensive) particularly when the casting of the babbitt facing is carried on under conditions which allow leakage of the Babbitt metal if it does not set immediately. A small amount of tin mixed with the lead will lower its melting point so that the plating metal does not have to be so highly heated as if lead alone were used. With the temperature of the bath lower the temperature of the brass as it comes from the plating operation will be correspondingly low so that the babbitt when poured will set more quickly. If the form does not accurately fit the brass, due for example to slight inequalities in the contacting surfaces of the brass, and the babbitt is poured against the plated surface of the brass with the latter at the relatively high temperature resulting from immersion in pure lead maintained at the fusion point, the babbitt may remain fluid long enough after pouring to leak out in objectionable quantities between the brass and the form. The amount of tin or other alloying metal which it is desirable to use will also depend upon the composition of the bearing. These bearings are composed largely of copper but contain a certain amount of lead and some tin as a general rule. Where the percentage of lead in the bearing is large, say 25 per cent., a good bond may be obtained by use of a solder which contains only 2% to 4% of tin. Under ordinary circumstances having regard both to the composition of the bearing and its fit with the mandrel it will not be necessary to use substantially more than 10% of tin or equivalent alloying metal. An important feature of my improvement lies in the use of a concentrated or substantially saturated solution of zinc chlorid as a flux. It is believed that under the heat of the molten babbitt the zinc chlorid disassociates and deposits zinc on the bearing improving the bond between bearing and babbitt so as to contribute to the saving in tin which my improved process effects.

I claim:

1. Method of making a babbitted bearing element which consists in applying to the bearing face of said element a flux consisting of a concentrated solution of zinc chlorid, then immersing the bearing element in a molten bath of lead, or an alloy of lead containing not substantially more than one part of the alloying metal to nine parts of lead, to plate the bearing face of said element, and then pouring the melted babbitt between said plated surface and a form placed against the edges of said surface.

2. Method of making a babbitted bearing element which consists in covering the bearing face of said element with a flux containing a metallic chlorid, plating said face with lead, or an alloy of lead containing not substantially more than one part of the alloying metal to nine parts of lead by applying the plating metal to the face of the bearing element in molten condition to form a thin film or wash of lead thereon, then pouring melted babbitt against said plated surface while the plating metal is still in a molten state.

3. A bearing element having a babbitted bearing facing united to the body of the bearing element by a thin film or plating of lead or an alloy of lead containing substantially not more than one part of tin to nine of lead.

4. The method of making a babbitted bearing element which consists in plating the bearing surface of a bearing element with a thin wash or film of lead, or an alloy of lead containing not substantially more than one part of the alloying metal to nine parts of the lead, then pouring melted babbitt against said plated surface while the plating metal is still in a molten state.

5. The method of making a babbitted bearing element which consists in plating the bearing surface of a bearing element with a thin wash or film of lead, or an alloy of lead containing not substantially more than one part of the alloying metal to nine parts of the lead, then pouring melted babbitt between said plated surface and a form placed against the edges of said surface.

6. The method of making a babbitted bearing element which consists of plating the bearing surface of the bearing element with a thin wash or film of a plating metal consisting principally of lead and then pouring melted babbitt against said plated surface while the plating metal is in a molten state.

7. A bearing element having a babbitted bearing face united to the body of the bearing element by a thin film or plating composed principally of lead.

8. The method of making a babbitted bearing element which comprises covering the bearing surface of said element with a flux consisting of a substantially saturated solution of zinc chlorid, plating said surface with a thin film of a plating metal consisting of lead and a smaller percentage of an alloying metal, then pouring melted babbitt against said plated surface while the plating metal is still in a molten state.

9. The method of making a babbitted bearing element which comprises covering the bearing surface of said element with a flux consisting of a substantially saturated solution of zinc chlorid, immersing this portion of the bearing element in a molten metal bath containing lead and a smaller percentage of tin, to plate said surface, and then pouring babbitt between said surface and a form placed against the edges of said surface while the plating metal is still in molten condition.

10. The method of making a babbitted bearing element which comprises covering the bearing surface of said element with a flux consisting of a substantially saturated solution of zinc chlorid, plating said surface with a thin film of a plating metal consisting of lead and an alloying metal and pouring babbitt against said surface while the plating metal is still in molten condition.

ROBERT JAY SHOEMAKER.